United States Patent [19]
Staub et al.

[11] Patent Number: 5,886,798
[45] Date of Patent: Mar. 23, 1999

[54] INFORMATION CARRIERS WITH DIFFRACTION STRUCTURES

[75] Inventors: René Staub, Cham; Wayne Robert Tompkin, Ennetbaden, both of Switzerland

[73] Assignee: Landis & Gyr Technology Innovation AG, Zug, Switzerland

[21] Appl. No.: 664,453

[22] Filed: Jun. 17, 1996

[30] Foreign Application Priority Data

Aug. 21, 1995 [EP] European Pat. Off. ............. 95810522

[51] Int. Cl.$^6$ ............................ G03H 1/00; B42D 15/00
[52] U.S. Cl. ................................ 359/2; 359/22; 359/29; 359/33; 359/567; 359/569; 283/86
[58] Field of Search ................... 283/86; 359/2, 359/3, 22, 24, 32, 33, 558, 566, 567, 569

[56] References Cited

U.S. PATENT DOCUMENTS

| | | | |
|---|---|---|---|
| 4,501,439 | 2/1985 | Antes | 283/86 |
| 4,556,378 | 12/1985 | Nyfeler et al. | 425/143 |
| 4,568,141 | 2/1986 | Antes | 359/2 |
| 4,758,296 | 7/1988 | McGrew | 156/231 |
| 4,840,757 | 6/1989 | Blenkhorn | 264/22 |
| 5,032,003 | 7/1991 | Antes | 359/567 |
| 5,059,776 | 10/1991 | Antes | 359/2 |
| 5,101,184 | 3/1992 | Antes | 235/454 |
| 5,106,125 | 4/1992 | Antes | 283/86 |
| 5,426,520 | 6/1995 | Kakae et al. | 359/2 |
| 5,486,933 | 1/1996 | Shindo et al. | 359/2 |

FOREIGN PATENT DOCUMENTS

| | | | |
|---|---|---|---|
| 0 105 099 B1 | 1/1986 | European Pat. Off. | B42D 15/02 |
| 0 360 969 A1 | 4/1990 | European Pat. Off. | G06K 19/08 |
| 0 375 833 B1 | 2/1993 | European Pat. Off. | B42D 15/02 |
| 42 37 415 A1 | 5/1993 | Germany | G06K 7/10 |
| 661 683 A5 | 8/1987 | Switzerland | B29C 43/52 |
| WO 93/24333 | 12/1993 | WIPO | B42D 15/16 |
| WO 95/04948 | 2/1995 | WIPO | 359/3 |

*Primary Examiner*—Jon Henry
*Assistant Examiner*—John Juba, Jr.
*Attorney, Agent, or Firm*—Proskauer Rose LLP

[57] ABSTRACT

An information carrier has at least one diffraction pattern which is formed from microscopically fine relief structures and which, upon being illuminated with coherent light, produces in two spatially separate directions, a first and a second image of an object. The images can be rendered visible on a screen or analysed by means of photodetectors. The two images have strong-light and/or weak-light picture elements and includes a symmetry insofar as a weak-light picture element of the second image can be associated with a strong-light picture element of the first image and vice-versa. Such information carriers are suitable as security elements for documents of all kinds such as, for example, banknotes, passes, identity cards, credit cards, etc., wherein at least a part of the security information is not visible under incoherent illumination conditions.

15 Claims, 5 Drawing Sheets

Fig. 7
Schweiz
Suisse
Schweiz
Suisse
Fig. 8
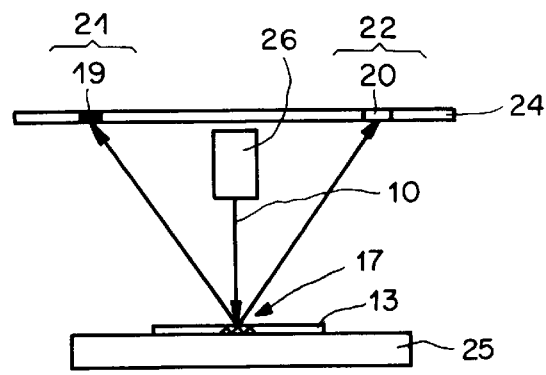
Fig. 9
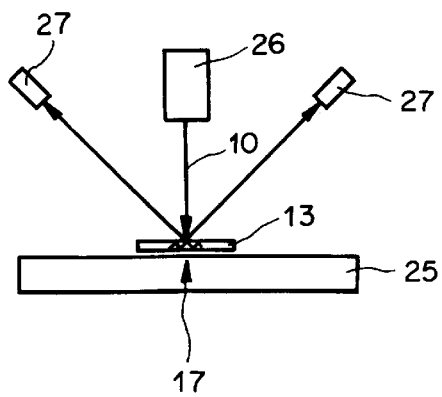

INFORMATION CARRIERS WITH DIFFRACTION STRUCTURES

BACKGROUND OF THE INVENTION

1. Field of the Invention

The invention relates generally to information carriers with diffraction structures and can be applied in particular to an information carrier having at least one diffraction pattern which has diffraction structures formed from microscopically fine relief structures and which, upon being illuminated with coherent light, produces in two spatially separate directions first and second images of an object which images can be rendered visible on a screen or analysed by means of photodetectors.

Such information carriers are preferably suitable for use as security elements for documents of all kinds as they are provided with items of information which can be discerned by eye or by photodetectors only under lighting with coherent light.

In the case of Fourier, Fresnel and Fraunhofer holograms the holographically stored object is not visible under normal, that is to say substantially incoherent, lighting conditions. However the object can be reconstructed as a real or as a virtual image when the hologram is lit with coherent light. In the case of white-light holograms such as for example rainbow holograms or with certain volume holograms on the other hand the stored object is also discernible under normal lighting conditions. An overview of the field of holography is to be found in the book "Handbook of Optical Holography" which was published by Academic press, Inc. in 1979.

2. Description of the prior Art

German laid-open application (DE-OS) No. 42 37 415, discloses an information carrier with a Fourier transformation hologram which, upon being lit with a laser beam, produces an image of a holographically recorded, two-dimensional object which can be made visible on a suitably arranged screen. To produce a visible image of the object on the screen, it is sufficient if the laser beam lights only a small surface portion of the hologram. More specifically, Fourier holograms have the advantageous properties that the image which is reconstructed in that way is independent of translatory movements of the information carrier and also has a great depth of focus. It is known from the section about Fourier holography in the above-quoted handbook that reconstruction involves the production not of a single direct image of the object but also a second conjugate image. With a perpendicular direction of lighting the two images are arranged in point-symmetrical relationship with respect to the axis of the laser beam and are of equal brightness.

An example of the two images of an object representing the word "CSIRO" which are produced upon coherent lighting of a Fourier hologram is shown photographically in the book "Optical Holography" by P. Hariharan in the series "Cambridge Studies in Modern Optics: 2" published by Cambridge University press (ISBN 0 521 31163 2).

The combination of a Fourier hologram and a hologram which is visible under normal lighting conditions is known from the Eurocheck card in the case of which the letters "ABNH" can be rendered visible on a screen upon being lit with coherent light, for example with a laser.

Fourier holograms may be for example in the form of microscopically fine relief structures, also referred to as surface reliefs, so that they can be inexpensively duplicated by embossing into a thermoplastic layer or by moulding into an UV-hardenable layer. Upon being lit with a laser emitting visible light, two images of the object are visible with the same levels of brightness on a suitably arranged screen.

Instead of Fourier holography it is also possible to use computer-generated holograms for producing a predetermined image. What is suitable for that purpose is in particular the kinoform which can be produced in the form of a surface relief.

SUMMARY OF THE INVENTION

An object of the present invention is to propose an information carrier which with coherent lighting produces an image which can be rendered visible on a screen and/or which with suitably arranged photodetectors can be checked in respect of its distribution of intensity and which cannot be either imitated or copied with holographic procedures.

An aspect of the present invention provides an information carrier having at least one diffraction pattern which has diffraction structures formed from microscopically fine relief structures and which, upon being illuminated with coherent light, produces in two spatially separate directions first and second images of an object which images can be rendered visible on a screen or analysed by means of photodetectors, wherein said diffraction pattern is of such a nature that the two said images have strong-light and/or comparatively weak-light picture elements and that a weak-light picture element of the second image can be associated with a strong-light picture element of the first image and vice-versa.

The invention also provides apparatus for manual and/or machine verification of the authenticity of such an information carrier, the apparatus comprising a light source for emitting coherent light, a platform for receiving the information carrier or a document provided with the information carrier, and a viewing screen and/or photodetectors, wherein both images produced by the information carrier are simultaneously visible on the viewing screen or wherein the photodetectors are operable to measure and analyse the levels of intensity of a part of the beam portions which are diffracted by the information carrier.

Advantageous configurations are set forth in the appendant claims.

The way in which the object of the invention is attained is based on the idea of obviating a property which is inherent in holograms, namely when the hologram is lit with a coherent light wave, the production of a direct image and a conjugate image of an object, which reproduce the same image content and which are approximately equally bright, or at least providing that the two images differ in terms of strength of light. That is achieved in that, in the case of an information carrier, diffraction structures for producing the image of an object are such that they fan out impinging coherent light as beam portions of different levels of intensity. In particular diffraction structures with an asymmetrical profile shape are suitable for that purpose.

For use of the information carrier as a security element with a high degree of safeguard against imitation, it is now firstly preferred for an apparatus for checking the security element to be designed in such a way that the direct and the conjugate images of a single object are visible in juxtaposed relationship on a viewing screen simultaneously but with different levels of brightness. Secondly, it is preferred that the diffraction structures of the information carrier are of such a configuration that two different objects are stored in the structure thereof. Upon reconstruction the direct image of the first object overlaps with the conjugate image of the second object and vice-versa. As the direct images are substantially brighter than the conjugate images, the direct images can be readily discerned by a human viewer. In the case of a holographically produced or imitated forgery the direct and the conjugate images of the two objects are of approximately equal brightness so that firstly the images on the screen can be perceived more or less only as light and dark smudged splodges and that secondly both images appear approximately the same.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 7 shows images with script characters, FIG. 8 shows an apparatus for visual checking of information concealed in the information carrier, and FIG. 9 shows an apparatus for machine checking of information concealed in the information carrier.

DESCRIPTION OF THE PREFERRED EMBODIMENTS

Figure 1:
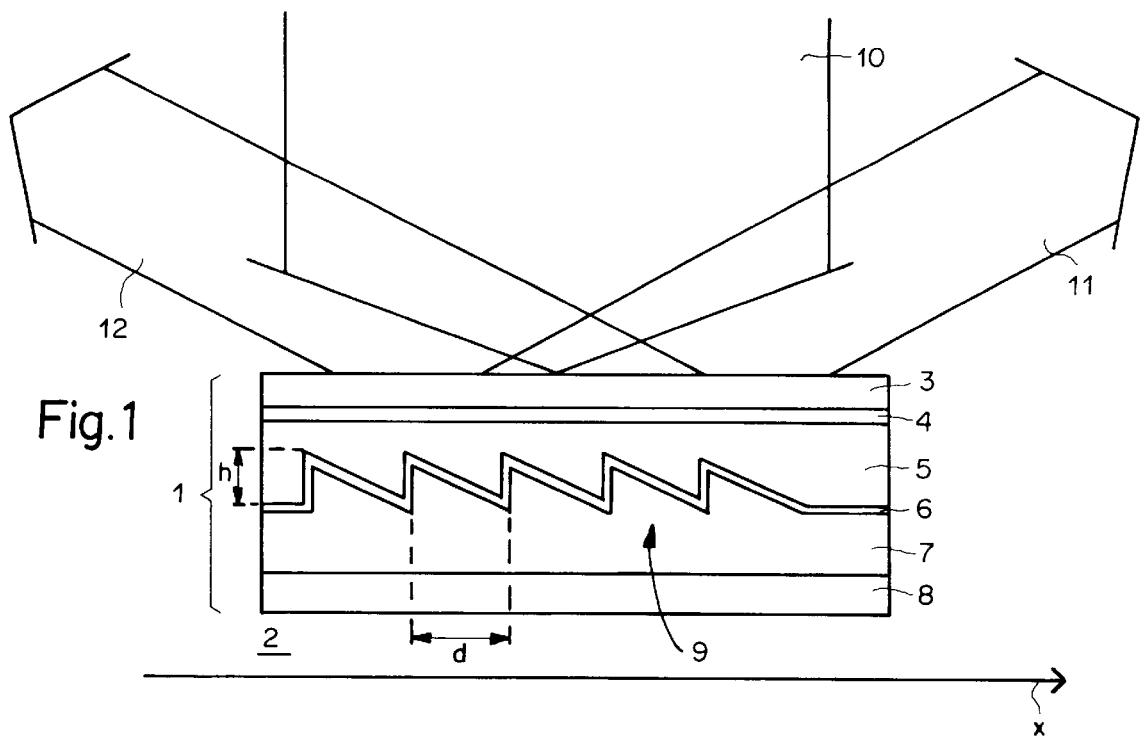
FIG. 1 is a view in cross-section of an information carrier with diffraction structures, which is in the form of a composite laminate.

FIG. 1 is a view which is not to scale of an information carrier 2 in the form of a composite laminate 1. The composite laminate 1 has a carrier foil 3 on which are disposed in the specified sequence an intermediate layer 4, a first lacquer layer 5, a reflection layer 6, a second lacquer layer 7 and an adhesive layer 8. Diffraction structures 9 are embedded in the two lacquer layers 5, 7. The diffraction structures 9 are microscopically fine relief structures which are for example embodied in the form of grating structures whose geometrical parameters line spacing, orientation and profile shape vary locally in a predetermined manner. The diffraction structure 9 shown in FIG. 1 is a one-dimensional grating which is oriented along an x-axis, with an asymmetrical, sawtooth-shaped profile shape. The grating 9 is characterised by the line spacing d and the profile height h. The grating 9 diffracts and reflects a portion of an impinging laser beam 10 in the form of a beam portion 11 in the positive first diffraction order and a further portion in the form of a beam portion 12 in the negative first diffraction order. A further component of the laser beam 10 is reflected back in the zero diffraction order. The light of the laser beam 10 is monochromatic coherent light of the wavelength $\lambda$. The line spacing d is so selected that on account of the relationship $$\sin\theta_n = \frac{n * \lambda}{d},$$

wherein n is an integer and $\Theta_n$ denotes the angle of the n-th diffraction maximum, only diffraction maxima occur for n=1 and n=−1. By virtue of the asymmetrical profile shape of the grating 9 the intensity of the beam portion 11 is greater than that of the beam portion 12. In that connection the parameters d and h of the sawtooth-shaped grating 9 are preferably so selected that the beam portion 11 is of greater light strength than the beam portion 12 by at least a factor of two. However, with sawtooth-shaped profiles, even with mass production, it is possible to achieve relationships in respect of intensity of the two beam portions 11, 12 of 10:1, which can be easily perceived by eye as involving different levels of brightness.

The diffraction structures 9 are embossed into the lacquer layer 5 for example by means of a heated embossing die in the form of microscopically fine relief structures, in which case the lacquer layer 5 comprises thermoplastic material. Such an embossing process is known for example from Swiss patent specification No. 661 683. In a further process as is known from U.S. Pat. Nos. 4,758,296 and 4,840,757, the diffraction structures 9 are formed in the lacquer layer 5 by moulding, in which case the lacquer layer 5 comprises UV-hardenable lacquer. The material adopted for the reflection layer 6 is metals, for example aluminium, or dielectric materials with a refractive index which clearly differs from that of the two lacquer layers 5, 7.

In dependence on the optical properties and the thickness of the reflection layer 6 and the optical properties of the two lacquer layers 5, 7, the beam portions 11, 12 occur in a reflection mode and/or a transmission mode.

The relief of the diffraction structures 9 has a typical profile height which is in the range of about 0.1 to 1.5 micrometre while the line spacing of the diffraction structures 9 is about 0.1 to 10 micrometre. An application of the second lacquer layer 7 of about 0.15 to 1.5 micrometre in thickness (for example 1 micrometre) completely levels off the relief. The same material, for example a thermoplastic acrylic polymer lacquer, is advantageously used for both lacquer layers 5 and 7. The second lacquer layer 7 serves primarily as a bonding primer between the reflection layer 6 and the adhesive layer 8. It can also be omitted.

Figure 2:
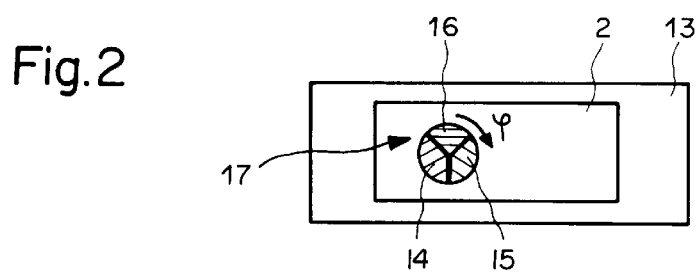
FIG. 2 is a plan view of a document provided with the information carrier.

FIG. 2 is a plan view of a document 13 with an information carrier 2 serving as a security feature. The document can be for example a banknote, a pass, an identity card, a credit card, a value-bearing card, a value-bearing paper etc. The information carrier 2 was glued onto the document 13 in a transfer process, the carrier foil 3 of the composite laminate 1 (FIG. 1) having been removed after the information carrier was glued on the document 13. The information carrier 2 includes three surface portions 14, 15 and 16 of equal size which are arranged in side-by-side relationship and which each include a respective diffraction structure 9 (FIG. 1) in the form of a grating with an asymmetrical profile shape. This side-by-side arrangement of surface portions is also referred to as juxtaposition. The three gratings involve the same profile shape and profile height h (FIG. 1) but angular orientations $\psi_1$, $\psi_2$ and $\psi_3$ which differ in relation to a reference direction and which are for example −10°, −180° and 10°. The grating-form diffraction structures 9 of the three surface portions 14, 15 and 16 form a diffraction pattern 17. Upon illumination of the diffraction pattern 17 with a perpendicular direction of incidence with the laser beam 10 (FIG. 1), that is to say with a coherent light beam, beam portions which are well-defined in terms of number and direction, with different levels of intensity, occur as a result of diffraction at the gratings of the three surface portions 14, 15 and 16. The intensity of the beam portions can be rendered visible in a simple fashion as a pattern of picture elements of different levels of brightness on a screen arranged in a plane parallel to the plane of the information carrier 2, if the wavelength $\lambda$ of the laser beam 10 is in the visible range of the electromagnetic spectrum (see FIG. 8).

The dimensions of the diffraction pattern 17 are smaller than the effective diameter of the laser beam 10 of for example 1.0 millimetre. They are typically 0.2 millimetre. The diffraction pattern 17 is thus discernible at most as a dot or not at all, by eye, from a normal viewing distance of at least 30 cm, under normal, that is to say incoherent lighting conditions. The internal structure of the diffraction pattern 17 can also not be resolved by eye and remains concealed to the naked eye. The document 13 preferably includes a plurality of identical diffraction patterns 17 which are more or less so far apart that there is always at least one disposed in the light spot of the laser beam 10.

Figure 3A:
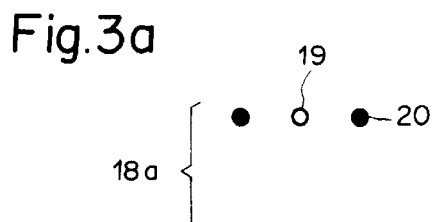
FIGS. 3a and 3b are images of diffraction patterns.

The pattern 18a which is produced on the screen by the diffraction pattern 17 is shown in FIG. 3a. The pattern 18a comprises three strong-light and three comparatively weak-light picture elements 19 and 20 respectively which are produced by the six beam portions of the first diffraction order. A strong-light picture element 19 is shown in the drawing in the form of a bordered circle with a white centre while a weak-light picture element 20 is shown in the form of a black-filled circle. This representation of strong-light and weak-light surfaces is also employed for the next Figures. As the surface portions 14, 15 and 16 (FIG. 2) occupy an area of equal size and as their gratings are oriented in the above-described manner, the brightness of the three picture elements 19 is equal and the brightness of the three picture elements 20 is equal: the pattern 18a is symmetrical with respect to the direction of incidence of the laser beam 10, which is perpendicular onto the diffraction pattern 17, in such a way that a weak-light picture element 20 which is arranged in point-symmetrical relationship is associated with a strong-light picture element 19. The geometrical shape of the surface portions 14, 15 and 16 and their mutual arrangement do not have any influence of substance on the pattern 18a if the grating line spacing d in each case is sufficiently small relative to the dimensions of the corresponding surface portions 14, 15 and 16 respectively. Whether the beam portions of the gratings, which are associated with higher diffraction orders, are also discernible as picture elements on the screen, depends on the various requirements involved. On the one hand the grating line spacing d and the wavelength λ of the laser beam determine which diffraction orders occur. On the other hand the dimensions and the shape of the screen and the spacing thereof relative to the information carrier 2 as well as any aperture elements which may be provided determine which beam portions impinge on the screen. The intensity of a beam portion also depends on the profile shape and the profile height h (FIG. 1) of the grating.

Figure 3B:
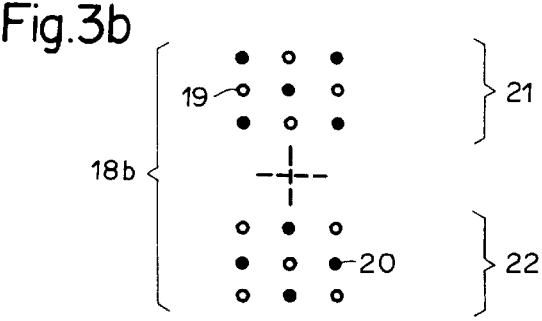

FIG. 3b shows the brightness distribution, which is produced with coherent illumination on the screen, of a diffraction pattern 17 (FIG. 2) which contains nine equal surface portions with sawtooth-shaped gratings, whose parameters line spacing d, with $d_1$, $d_2$ and $d_3$, and angular orientation ψ with $ψ_1$, $ψ_2$, and $ψ_3$ each assume three different values.

From the point of view of the viewer, the pattern 18b in FIG. 3b, which is produced on the screen, is discernible based on Fourier holography in the form of two images 21, 22 of a two-dimensional object, in which case weak-light picture elements 20 of the second image 22 correspond to strong-light picture elements 19 of the first image 21, and vice versa. When the laser beam 10 is incident perpendicularly onto the plane containing the diffraction pattern 17, the images 21, 22 are point-symmetrical with respect to the axis of incidence of the laser beam 10, which is marked by a broken-line cross. When the laser beam 10 is inclinedly incident on the diffraction pattern 17 the images 21, 22 are only approximately symmetrical with respect to the axis of the beam. The symmetry of the relative brightness of the two images 21, 22 is however retained. The angles ψ of the gratings belonging to the diffraction pattern 17 are preferably so selected that the entirety of the beam portions 11, 12 produced (FIG. 1) divides into two beams involving spatially separate directions so that the pattern 18b is unequivocally discernible as two non-overlapping images 21, 22.

The combination of a plurality of surface portions 14, 15, 16 etc. with different grating structures to form a diffraction pattern 17, wherein the surface portions 14, 15 . . . are arranged in side-by-side relationship, results in spatial modulation of the beam portions 11, 12 which are associated with the individual grating structures. The picture elements 19, 20 produced on the screen therefore present a distribution in respect of intensity which approximately corresponds to the Fourier transform of the arrangement of the surface portions 14, 15, . . . Whether that distribution in respect of intensity is discernible depends on the geometrical dimensions of the surface portions 14, 15, . . . in comparison with the grating line spacing d.

Figure 4A:
FIGS. 4a through 4c show images of sawtooth-shaped diffraction gratings.
Figure 4B:
Figure 4C:
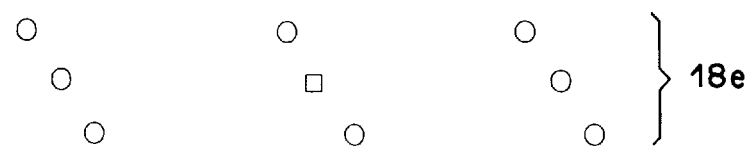

FIG. 4a shows the pattern 18c which is produced on a screen upon illumination with a perpendicularly impinging laser beam, of a first sawtooth-shaped diffraction grating with line spacing $d_1$ and angular orientation $ψ_1$. The picture element which is shown as a square corresponds to a light spot corresponding to the zero diffraction order. FIG. 4b shows the pattern 18d of a second sawtooth-shaped diffraction grating with line spacing $d_2$ and angular orientation $ψ_2$. The line spacing $d_2$ is selected to be greater than the line spacing $d_1$ so that the spacing of the picture elements of the pattern 18d is smaller than the spacing of those of the pattern 18c. Finally FIG. 4c shows the pattern 18e of a third diffraction grating which is produced in the form of the super-impositioning of the first and second diffraction gratings. The pattern 18e corresponds to the folding of the diffraction characteristics of the first and second diffraction gratings, that is to say the patterns 18c and 18d. Because of the spatial asymmetry of the third diffraction grating the various picture elements exhibit different brightness which is not shown in FIG. 4c.

Figure 5A:
FIGS. 5a through 5e show patterns which can be produced with diffraction structures.
Figure 5B:
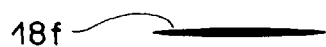
Figure 5C:
Figure 5D:
Figure 5E:
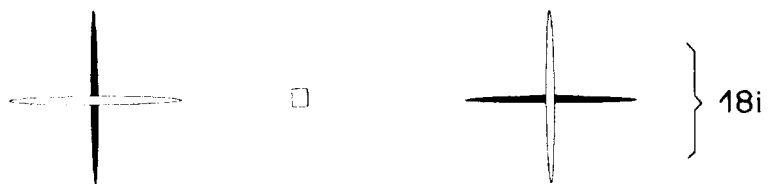

If the second diffraction grating is replaced by a diffraction structure which has a more general surface texture, patterns with lines and surfaces can also be produced instead of patterns 18c–e with discrete picture elements. FIG. 5a in turn shows the pattern 18c, which is produced on a screen upon illumination with a perpendicularly impinging laser beam, of a first sawtooth-shaped diffraction grating with line spacing $d_1$ and angular orientation $ψ_1$, FIG. 5b shows the pattern 18f of a second diffraction structure which is in the form of a rough surface whose texture has a preferential direction and diffusely scatters the perpendicularly impinging light in a predetermined spatial angle range. The pattern 18f is a line-like light spot of approximately constant brightness. FIG. 5c shows the pattern 18g of a third diffraction structure produced by superimposition of the first diffraction grating and the second diffraction structure. Rotation of the diffraction structure which produces the pattern 18f through an angle of 90° and superimposing the grating structure producing the pattern 18c gives a fourth diffraction structure which produces the pattern 18h shown in FIG. 5d. Finally FIG. 5e shows a pattern 18i which is produced when the third and fourth diffraction structures which produce the two patterns 18g and 18h are arranged in side-by-side relationship in surface portions 14, 15 (FIG. 2). It should be incidentally mentioned here that the patterns 18g and 18h can also be produced with other diffraction gratings whose line spacing varies locally or whose grating grooves are curved and which are of an asymmetrical profile shape.

Figure 6A:
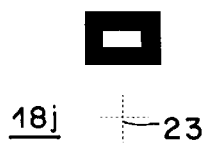
FIGS. 6a through 6g show further patterns which can be produced with diffraction structures.
Figure 6B:
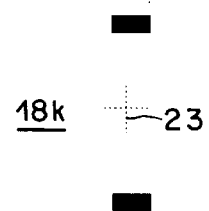
Figure 6C:
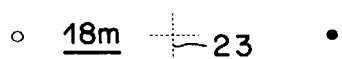
Figure 6D:
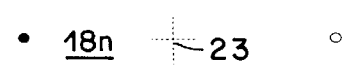
Figure 6E:
Figure 6F:
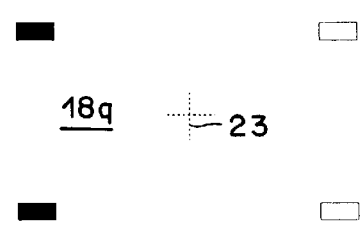
Figure 6G:
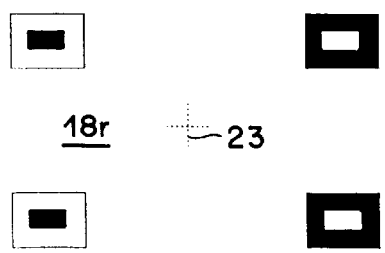

Juxtaposition and superimposition may be combined as desired in order to produce from simple diffracting basic structures a diffraction pattern which produces any pattern. Such a process is described with reference to the patterns in FIGS. 6a–g. FIG. 6a shows the pattern 18j produced on the screen by a diffraction structure obtained by means of Fourier holography, and a cross 23 defining the beam axis. The pattern 18j comprises the direct and the conjugate image of a first object. FIG. 6b shows as a pattern 18k the direct and the conjugate images of a second object which is to be found locally on the screen at the same location as the first object. FIGS. 6c and 6d show the patterns 18m and 18n respectively of asymmetrical grating structures which are turned through 180 ° relative to each other. The patterns 18p and 18q respectively shown in FIGS. 6e and 6f are produced by means of superimposition of the diffraction structures producing the patterns 18j, 18m and 18k, 18n respectively. Finally, juxtaposition of the diffraction structures forming the basis for the patterns 18p and 18q results in the pattern 18r in which the two objects are each visible twice at different levels of brightness and with mutual interleafing.

In particular a kinoform is suitable as a diffraction pattern 17 (FIG. 2) for producing any two-dimensional image. The kinoform in its original form is a pure phase object, that is to say the kinoform locally varies the phase of the coherent light beam 10 used to produce the image (FIG. 1). However the amplitude of the light beam 10 undergoes no alteration. The image produced appears in the direction of the zero diffraction order, that is to say the image produced and the transmitted or reflected light beam 10 are spatially not separated. In a modification of the kinoform which was proposed in 1971 by Kirk & Jones, the amplitude of the light beam 10 is also locally variable by superimposing on the kinoform an additional diffraction grating with locally variable profile height. The additional diffraction grating provides on the one hand that, instead of a single image in the direction of the zero diffraction order, further partially distorted images are produced in positive and negative diffraction orders, the direction of the diffraction orders being determined by the grating line spacing and the orientation of the additional diffraction grating as well as the wavelength $\lambda$ of the light beam 10. On the other hand the contribution of the light diffracted in a given diffraction order by each surface element of the kinoform depends on the local profile height of the additional diffraction grating, and that corresponds to amplitude modulation. The amplitude modulation however is correct only for a single predetermined diffraction order.

The kinoform as a phase object can be produced as a surface relief which is suitable for inexpensive mass production by virtue of its simple multiplication by embossing or casting. A detailed description of the kinoform is to be found in Volume XVI of the series "Progress in Optics" published by E. Wold, North-Holland publishing Company (ISBN 0 444 85 087 2).

The kinoform represents a specific example of a computer-generated hologram (CGH). An overview of computer-generated holograms is to be found by the article by Wai-Hon Lee in above-mentioned Volume XVI of the series "progress in Optics". Initially computer-generated holograms were embodied in the form of amplitude holograms. Further developments then resulted in the kinoform, that is to say the computer-generated hologram in the form of surface reliefs.

A number of processes are known for producing computer-generated holograms. For example, synthesis of the computer-generated hologram by means of masks is a possibility, similarly to the processes used in the semiconductor art. Such a process is described in the article by J. J. Clair and C. I. Ambitol in above-mentioned Volume XVI of the series "progress in Optics". Another process makes use of electron beam lithography in which an electron beam directly writes on a layer of resist. An etching process is then effected to produce the surface relief, the etching rate and thus the surface relief being determined by the local dosage of the electron radiation. The surface relief of a kinoform on which a grating structure serving as a carrier profile is superimposed can also be computed and produced using the methods of computer-generated holograms.

Superimposition of a diffraction grating with a non-symmetrical profile form but a predetermined fixed profile height over the surface relief of a kinoform now results in the production of images in spatially separate directions, upon being illuminated with coherent light, which images involve different levels of brightness. That superimposition corresponds to the above-mentioned superimposition of two mutually independent diffraction structures.

FIG. 7 shows an image which is produced on a screen by a diffraction pattern 17 (FIG. 2), with coherent illumination, and which contains two different sets of script. The sets of script occur twice, more specifically in the form of strong-light and also weak-light script, in the same colour. The strong-light scripts are shown in bold and the weak-light scripts are shown in the form of bordered script. The first script consists of the word "Schweiz" and the second script consists of the word "Suisse". The strong-light and the weak-light script "Schweiz" are in the same orientation. The relative arrangement of the script "Suisse" with respect to the script "Schweiz" can be freely selected. The scripts can be for example rotated relative to each other. Advantageously, the strong-light image of the first script and the weak-light image of the second script are at least partially superimposed on each other. With given technologies, the strong-light image of the second script and the weak-light image of the first script are then also automatically superimposed on each other. From the point of view of the viewer, what appear on the screen are two respective representations of two different objects, namely a strong-light and a weak-light representation in each of two spatially separate directions. With an intensity ratio of for example 10:1 between the strong-light and the weak-light scripts the strong-light scripts are perceived as dominant. In contrast the weak-light scripts are recognised only when the viewer looks more closely. The diffraction pattern 17 for producing the scripts "Schweiz" and "Suisse" comprises for example two diffraction structures 9 which are arranged in side-by-side relationship in surface portions 14, 15 and which both, as described above, are in the form of a kinoform with a superimposed asymmetrical grating structure serving as a carrier profile.

The resolution capability in respect of the scripts "Schweiz" and "Suisse", that is to say generally the images 21, 22, which can be achieved in the event of coherent illumination, on the screen 24, increases with increasing size of the diffraction pattern 17. If the area occupied by the diffraction pattern 17 is several tenths of a square millimetre in size, it could be that the area occupied by the diffraction pattern 17 on the information carrier 2, under normal illumination conditions, results in perceptible changing diffraction effects because of the superimposed carrier profile. The information in the kinoform however remains concealed.

In the holographic production of a copy of the corresponding diffraction pattern using the contact process, the information in the asymmetrical profile shape is lost so that, upon illumination with coherent light, both the script "Schweiz" and also the script "Suisse" are produced as a direct image and as a conjugate image, at approximately the same level of brightness. Because of the superimposition of the two scripts they are then visible on the screen only as more or less unreadable brightness spots, so that a copy can be easily distinguished from the original. With a further holographic copying process, in the copy the same image appears with the same brightness distribution on both sides of the illuminating beam so that in this case also the copy can be easily distinguished from the original.

With simple diffraction structures 9, for example with gratings, upon illumination with a coherent light beam there is a finite number of discrete beam portions 11, 12 which can be rendered visible in the form of patterns with discrete, separate picture elements 19, 20. Upon illumination with coherent light, diffraction structures 9 which have a more complicated surface texture, for example a kinoform, produce a spatially continuous light distribution which can be rendered visible as a pattern with continuous brightness distribution.

The brightness distributions which are produced by the diffraction pattern 17 or by an assembly of spatially separate but identical diffraction patterns 17 which are simultaneously illuminated are distinguished by a great depth of focus: the pattern 18 which is rendered visible on a screen is fairly sharp over a wide range of spacings between the information carrier 2 and the screen.

That property arises by virtue of the small area which is illuminated by the laser beam 10 and which is typically less than two to three mm$^2$. Only the size of the pattern 18 increases with increasing distance between the information carrier 2 and the screen.

The quality of the patterns 18 (FIGS. 3–7) or images of an information carrier 2 (FIG. 2), which are produced upon illumination with coherent light, depends not only on the quality of the diffraction pattern 17 but also the nature of the surface of the document 13 to which the information carrier 2 was applied. With a flat surface the diffraction structures 9 can be locally very finely structured to produce an image which is provided with many details. In the case of a rough surface to which the information carrier 2 containing the diffraction structures 9 adapts in positively locking relationship, the angular relationship which is in itself locally predetermined as between the illuminating light beam 10 and the contour of the diffraction structures 9 is more or less lost. The result of this is that, instead of a monochromatic image with fine brightness distribution, an unsharp and/or blurred image is produced, in which the fine details are lost. When using the information carrier 2 as a security element on a document 13 with a rough surface, such as for example a banknote, it is therefore preferred to provide a diffraction pattern 17 with diffraction structures 9 which diffracts the impinging light beam 10 into a limited number of discrete, spatially clearly separate beam portions which can be rendered visible as separate picture elements 19, 20 or photoelectrically analysed. A suitable arrangement is for example the diffraction pattern 17 which is shown in FIG. 2 and which produces the pattern 18a shown in FIG. 3a with only six picture elements 19, 20 if the difference in the angular orientations $\psi_1$ to $\psi_3$ is sufficiently great. Because of the roughness of the surface of the document 13 the beam portions are then subjected to a greater or lesser degree of spread in terms of light beams, that is to say they may involve a considerable degree of divergence. The divergence of the individual beam portions varies locally and is thus a statistically distributed parameter. However the intensity relations of different beam portions is maintained even among the light beams and can be detected if the spatial separation between the beam portions is greater than the divergence of the individual beam portions. If moreover the light beam 10 is of a diameter which is substantially greater than the dimension of an individual diffraction pattern 17 and illuminates a whole assembly of diffraction patterns 17, then the divergence of the beam portions is scarcely any longer a function of the location of the illuminated surface, that is to say the direction and extent of the light beams are approximately constant. The intensity relations can therefore still be determined by eye or machine, on a screen or with photodetectors whose position and light-sensitive surface area is matched to the maximum divergence of the light beams, and they can verify the authenticity of the document 13.

FIG. 8 shows an apparatus for rendering the information stored in the information carrier 2 (FIG. 2) in the form of a diffraction pattern 17 visible on a screen 24 in the form of two images 21, 22. The apparatus has a platform 25 for receiving the document 13 provided with the information carrier 2, and a laser 26 which serves as a coherent light source and whose beam 10 impinges with a perpendicular direction of incidence onto at least one surface portion of the information carrier 2. In order to render visible the light which is diffracted and reflected by the diffraction pattern 17 of the information carrier 2 the screen 24 is made from a milky-cloudy glass which diffusely scatters impinging light so that the images 21, 22 produced by the diffraction pattern 17 can be viewed from an observation point outside the apparatus. The risk that laser light could pass directly into the eyes of a viewer therefore does not arise. The shape and dimensions of the screen 24 are further so predetermined that all relevant parts of the image produced are visible. It is also possible to use a laser diode whose wavelength $\lambda$ is for example 670 nanometres and is thus in the red range so that it is possible to use a commercially available inexpensive laser diode. Associated with a strong-light picture element 19 of the one image 21, 22 is a weak-light picture element 20 of the other image 22 and 21 respectively, in which respect the images 21, 22 may be point-symmetrical or not point-symmetrical.

The diffraction pattern 17 is advantageously provided a plurality of times on the information carrier 2 and the laser beam 10 is of such a large diameter that there is always at least one diffraction pattern 17 that is illuminated. The distribution in respect of brightness of the image which is visible on the screen 24 is thus independent of the position of the information carrier 2 on the platform 25.

FIG. 9 shows an apparatus for machine checking of information which is stored in concealed form in the information carrier 2. It differs from the apparatus described hereinbefore essentially in that, instead of the screen 24, there are photodetectors 27 or at least a one-dimensional or two-dimensional array with photodetectors. The diffraction pattern 17 and the geometrical arrangement of the photodetectors 27 are so matched to each other that image regions or beam portions from the diffraction pattern 17 impinge on the photodetectors 27 so that it is possible to determine the level of intensity of selected beam portions. The apparatus is further designed to form from the measured levels of intensity and in particular the ratios thereof an information signal as to whether the information carrier 2 is to be viewed as genuine.

The diffraction pattern 17 represents an invisible security element which contains concealed information which is first made visible upon being illuminated with coherent light.

The above-described superimposition of any diffraction structure which upon being illuminated with coherent light produces an image of an object on a screen, and a diffraction grating with a sawtooth-shaped profile shape, that is to say generally an asymmetrical diffraction structure, can also be viewed as modulation of the profile shape of said any diffraction structure with a spatially asymmetrical carrier profile. As a result what is obtained is a diffraction structure which upon being illuminated with coherent light, according to the nature of the carrier profile, produces at least two geometrically identical images of the same object, which are spatially separate and which involve different strengths of light. In that respect there is a symmetry in the form of a reversal of contrast insofar as associated with a strong-light point of the first image is a relatively weak-light point of the second image. That reversal of contrast represents an easily verifiable security feature. If the carrier profile varies locally and in that respect involves a symmetrical profile shape in certain areas, parts of the first image and of the second image may also involve identical levels of brightness, instead of different levels of brightness. Furthermore, depending on the configuration of the diffraction pattern 17, the picture elements 19, 20 may have only two brightness stages, strong-light and weak-light or light and dark, or a plurality of brightness stages. The symmetry of the reversal in contrast then means that associated with the strongest-light picture element is the weakest-light picture element, associated with the second strongest-light picture element is the second weakest-light picture element etc.

Diffraction patterns 17 which contain concealed items of information can be combined on the information carrier 2 in many ways with further diffraction structures 9 whose geometrical parameters, line spacing, orientation and profile shape, vary locally in a predetermined manner in such a way that when the information carrier 2 is viewed and moved under normal conditions of illumination, they produce striking changing optical-diffraction effects such as for example different colour effects or changes between light and dark. A further optical effect can provide that adjacent surface elements are visible in different levels of brightness or in different colours, in which case the relative brightness or colour of the surface elements changes when the information carrier 2 is rotated or tilted. The diffraction structures 9 may in particular produce the changing optical effects as are known from holograms or from optical variable devices, as are described for example in European patent specification No. 375 833. The optical effects of the diffraction structures 9 represent a feature which can be visually easily checked. European patent specification No. 105 099 discloses optical-diffraction security elements in which generally only a fraction of the surface occupied by the security element is provided with diffraction structures 9. The rest of the surface is not optically-diffractively active and for a human viewer can act in particular like a mirror. This surface component which is not used for visible effects is suitable for receiving a multiplicity of diffraction patterns for storing concealed information. Those diffraction patterns can all be identical and represent the same information or they may contain information which changes from one diffraction pattern to another in accordance with a predetermined plan. A further possible form of combination lies in subdividing an optical-diffraction security element into raster fields, in the manner described in European patent specification No. 7 375 833. Each raster field is further subdivided into at least two field components. For each raster field the first field component is occupied by a diffraction pattern for the storage of concealed information, while the other field components contain any diffraction patterns for the diffraction of incoherent visible light. The second, third etc. field components represent for example a respective image which appears at a different viewing angle.

In accordance with a further configuration, such a diffraction pattern may both contain items of information which are only discernible upon being illuminated with coherent light, and also generate changing optical effects of the above-indicated kind, under normal illumination conditions.

The line spacings d and profile heights h of the two superimposed diffraction structures may be of different or comparable size. The reflection layer 6 and the second lacquer layer 7 may also be a single layer with a refractive index which is clearly different from the lacquer layer 5 so that the composite laminate 1 is possibly approximately transparent over large parts of the visible range of the electromagnetic spectrum.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An information carrier having at least one diffractive pattern containing diffractive structures of microscopically fine relief structures, wherein light diffracted from said information carrier, upon being illuminated with coherent light, is rendered visible on a screen and produces a first image of an object in a first direction and a second image of said object in a second angularly separated direction, wherein said diffractive pattern is such that the first image has at least strong-light picture elements, the second image has at least weak-light picture elements, wherein a weak-light picture element of the second image is associated with a strong-light picture element of the first image, and wherein said diffractive pattern comprises the superimposition of one of a Fourier and kinoform hologram on a diffractive structure having an asymmetrical profile shape, serving as a carrier profile.

2. The information carrier of claim 1, wherein upon coherent illumination of the diffractive pattern with a direction of incidence which is perpendicular to the diffractive pattern, the first and second images are point-symmetrical with respect to the direction of incidence.

3. The information carrier of claim 1, which comprises additional diffractive structures which, under ambient non-coherent illumination conditions, produce optical effects which change when the information carrier is being one of rotated or tilted.

4. Apparatus for manual verification of the authenticity of the information carrier of claim 1, comprising a light source for emitting coherent light, a platform for receiving the information carrier arranged on a substrate, and a viewing screen arranged such that said first and second images produced by the information carrier are simultaneously visible on the viewing screen.

5. Apparatus for machine verification of the authenticity of the information carrier of claim 1, comprising a light source for emitting coherent light, a platform for receiving said information carrier arrange a substrate, and photodetectors for receiving the light beam portions diffracted by said information carrier, wherein said photodetectors are operable to measure and analyze the levels of intensity of a part of the beam portions diffracted by the information carrier.

6. The information carrier of claim 1 further comprising additional diffractive structures which, under ambient non-coherent illumination conditions, produce optical effects which change when the information carrier is being one of rotate or tilted, and the surface thereof is divided into raster fields, wherein each raster field is subdivided into at least two field components of which at least one is occupied by said diffractive pattern and at least one is occupied by one of said additional diffractive structures producing visual optical effects.

7. The information carrier of claim 1, wherein said diffractive pattern is divided in a plurality of areas, each being approximately several tenths of a millimeter squared, dispersed between additional diffractive structures which, under ambient non-coherent illumination conditions, produce optical effects which change when the information carrier is being one of rotated or tilted.

8. An information carrier having at least two diffractive patterns containing diffractive structures of microscopically fine relief structures, wherein light diffracted from said information carrier, upon being illuminated with coherent light, is rendered visible on a screen and produces first image of an object in a first direction and a second image of said object in a second angularly separated direction, wherein said diffractive pattern is such that the first image has at least strong-light picture elements, the second image has at lest weak-light picture elements, wherein a weak-light picture element of the second image is associated with a strong-light picture element of the first image, wherein the first image comprises a strong-light representation of a first object and a weak-light representation of a second object, said first image representations at least partially overlapping, and wherein the second image contains a weak-light representation of the first object and a strong-light representation of the second object, said second image representations at least partially overlapping.

9. The information carrier of claim 8, wherein said first and second diffractive patterns comprise the superimposition of one of a Fourier and kinoform hologram with a diffractive structure for a first and second image, wherein the diffractive structure serves as a carrier profile, with an asymmetrical profile shape.

10. The information carrier of claim 8, wherein said first and second diffractive patterns comprise a first superimposition of a Fourier hologram and a diffractive structure for the first image, and a second superimposition of a kinoform hologram and a diffractive structure for the second image, wherein the diffractive structures serve as carrier profiles, with an asymmetrical profile shape.

11. The information carrier of claim 8, wherein the diffractive pattern comprises simple diffractive structures, which upon illumination with coherent light, only a limited number of reflected and diffracted beam portions are produced and the spatial separation of the beam portions is greater than the maximum divergence of the beam portions.

12. The information carrier of claim 8, wherein upon coherent illumination of the diffractive pattern with a direction of incidence which is perpendicular to the diffractive pattern, the first and second images are point-symmetrical with respect to the direction of incidence.

13. The information carrier of claim 8, which comprises additional diffractive structures which, under ambient non-coherent illumination conditions, produce optical effects which change when the information carrier is being one of rotated or tilted.

14. The information carrier of claim 8 further comprising additional diffractive structures which, under ambient non-coherent illumination conditions, produce optical effects which change when the information carrier is being one of rotated or tilted, and the surface thereof is divided into raster fields, wherein each raster field is subdivided into at least two field components of which at least one is occupied by said diffractive pattern and at least one is occupied by one of said additional diffractive structures producing visual optical effects.

15. The information carrier of claim 8, wherein said diffractive pattern is divided in a plurality of areas, each being approximately several tenths of a millimeter squared, dispersed between additional diffractive structures which, under ambient non-coherent illumination conditions, produce optical effects which change when the information carrier is being one of rotated or tilted.

* * * * *